(12) United States Patent
Miller et al.

(10) Patent No.: US 7,298,278 B2
(45) Date of Patent: Nov. 20, 2007

(54) AUTOMATIC DELIVERY/DRAIN DETECTION USING A LEVEL MONITORING SYSTEM

(75) Inventors: Wojtek Miller, Knoxville, TN (US); John O'Brien Evans, II, Knoxville, TN (US)

(73) Assignee: Robertshaw Controls Company, Richmond, VA (US)

( * ) Notice: Subject to any disclaimer, the term of this patent is extended or adjusted under 35 U.S.C. 154(b) by 179 days.

(21) Appl. No.: 11/199,983

(22) Filed: Aug. 9, 2005

(65) Prior Publication Data

US 2006/0032863 A1 Feb. 16, 2006

Related U.S. Application Data

(60) Provisional application No. 60/600,279, filed on Aug. 10, 2004.

(51) Int. Cl.
*G08B 21/00* (2006.01)

(52) U.S. Cl. .................. 340/603; 340/612; 340/618

(58) Field of Classification Search ........ 340/568, 340/612, 613, 614, 618, 623, 603, 625, 539.1, 340/539.22
See application file for complete search history.

(56) References Cited

U.S. PATENT DOCUMENTS

| | | | |
|---|---|---|---|
| 4,313,114 A * | 1/1982 | Lee et al. ............ | 340/870.23 |
| 4,353,245 A | 10/1982 | Nicolai | |
| 4,788,648 A | 11/1988 | Ferretti et al. | |
| 5,400,010 A | 3/1995 | Lechevalier | |
| 5,463,595 A | 10/1995 | Rodhall et al. | |
| 5,708,404 A | 1/1998 | Kurisu et al. | |
| 5,708,424 A | 1/1998 | Orlando et al. | |
| 6,064,311 A | 5/2000 | Ferenczi et al. | |
| 6,822,565 B2 * | 11/2004 | Thomas et al. ......... | 340/539.1 |
| 6,922,144 B2 | 7/2005 | Bulin et al. | |
| 6,925,855 B2 * | 8/2005 | De Ronne et al. ........ | 73/49.7 |
| 6,985,071 B1 | 1/2006 | Tanaka | |
| 7,002,481 B1 * | 2/2006 | Crane et al. ............. | 340/618 |
| 2004/0027248 A1 | 2/2004 | Lile | |
| 2004/0140909 A1 | 7/2004 | Meadows et al. | |
| 2005/0083197 A1 | 4/2005 | Glenn et al. | |
| 2006/0033618 A1 | 2/2006 | Miller | |

OTHER PUBLICATIONS

Veeder-Root Company, TLS-350R Monitoring Systems, brochure, copyright 2002, 4 pages.

* cited by examiner

*Primary Examiner*—Jeffery Hofsass
*Assistant Examiner*—Hoi C. Lau
(74) *Attorney, Agent, or Firm*—Reinhart Boerner Van Deuren P.C.

(57) ABSTRACT

A system for monitoring a level of product in a tank to detect one of a delivery and a drain operation is provided. The system comprises a monitor and a data center. The monitor is operably coupled to the tank and adapted to detect the level of product in the tank at a first rate and at a second rate. The data center is in communication with the monitor and adapted to receive a user inputtable threshold level of change. The monitor detects the level of product in the tank at the first rate until the threshold level of change is detected. Thereafter, the monitor detects the level of product in the tank at the second rate. The data center generates an alarm signal to indicate that one of the delivery and the drain has occurred.

8 Claims, 7 Drawing Sheets

AUTOMATIC DELIVERY/DRAIN DETECTION USING A LEVEL MONITORING SYSTEM

CROSS-REFERENCE TO RELATED PATENT APPLICATIONS

This patent application claims the benefit of U.S. Provisional Patent Application No. 60/600,279, filed Aug. 10, 2004, the teachings and disclosure of which are hereby incorporated in their entireties by reference thereto.

FIELD OF THE INVENTION

This invention relates generally to a tank level monitoring system, and more particularly, to a tank level monitoring system capable of automatically detecting a delivery event and a drain event of a product to/from the tank.

BACKGROUND OF THE INVENTION

A tank or similar vessel is often employed at a factory, construction site, warehouse, and the like, to receive, store, and distribute a product. These tanks are adapted to accommodate a variety of different products such as, for example, gasoline, propane, fertilizer, chemicals, fuels, and the like. The tanks that hold these products are often being drained of, and subsequently replenished with, the product both during and outside of normal business hours.

Unfortunately, the tanks described above can often be located in remote areas, are not adequately covered by surveillance, watched by owners and employees who use the tanks, and the like. Therefore, the vendors delivering the product to the tanks can either invoice the tank owner for more of the product than is actually delivered (i.e., with gasoline) or invoice for more of the product than is removed (i.e., with waste removal). Currently, such over-invoicing practices are difficult if not impossible to detect unless the tank owner is physically present to check the tank level immediately before and after the filling/drain operation. However, in most circumstances, this direct supervision is not available.

While constant reporting of parameters pertaining to such tanks would be ideal, such is often not practical or commercially feasible. For example, in cellular and satellite metering technology, each set of data that is sent has a cost. Since the typical approach is to read monitor data periodically and then send a report, a data report can be sent quite often (e.g., once an hour), which is expensive, or can be sent infrequently (e.g., once a day), which provides delayed and very limited knowledge about what has happened with monitored parameters. When battery-powered devices are used to monitor tank parameters, the cost noted above is significantly higher. For instance, each packet of data sent uses a portion of battery life and the expense involved in battery replacement in remote locations can be very high.

Thus, a system and method that can monitor a product level in a tank, accurately track, and generate an notification signal if a delivery and/or drain of the product occurs would be desirable. Such information may then be used to verify the invoicing of product into or out of the tank. The invention provides such a system and method. These and other advantages of the invention, as well as additional inventive features, will be apparent from the description of the invention provided herein.

BRIEF SUMMARY OF THE INVENTION

The innovation in Centeron® products is that monitors can check the tank level frequently but report data very seldom unless there is an unexpected change in the tank level. For example, the tank level can be read every fifteen minutes, but scheduled reports can be sent once per day or once per week. After each reading, a set of programs check the level against predefined criteria. An alarm report is sent immediately if any alarm condition is discovered.

The following programs can be activated: The delivery detection, which detects delivery to the tank and reports level before and after delivery immediately after delivery end, the theft detection, which monitors tank level during a guard time (e.g., night, weekends, etc.) and send the alarm report when level was changed during the guard time, and the excessive usage detector, which monitors level between scheduled reports and sends the alarm report if the level change exceeds maximum accepted range. This technology improves the system of providing tank monitoring for battery powered cellular and satellite systems.

In one aspect, the invention provides a system for monitoring a level of product in a tank to detect at least one of a delivery and a drain operation. The system comprises a monitor and a data center. The monitor is operably coupled to the tank and adapted to detect the level of product in the tank at a first rate and at a second rate. The data center is in communication with the monitor and adapted to receive a user inputtable threshold level of change. The monitor detects the level of product in the tank at the first rate until the threshold level of change is detected. Then the monitor detects the level of product in the tank at the second rate. The data center generates an alarm signal to indicate that at least one of the delivery and the drain has occurred.

In another aspect, the invention provides a method of detecting at least one of a delivery and a drain of product in a storage tank. To begin, a product level in the tank is monitored at a first rate until a determination is made that at least one of the delivery or drain of product has begun. The product level in the tank is then monitored at a second rate until a determination is made that the at least one of the delivery or drain of product has ended. Next, information related to an amount of product delivered or drained during the at least one of the delivery or drain of the product is transmitted.

In yet another aspect, the invention provides a method of detecting at least one of a delivery and a drain of product to and from a storage tank. To begin, a user interface having user selectable options presented thereon is displayed. Thereafter, at least one of a delivery function selection and a user drain function selection is received. A user input threshold level of change for the at least one of the delivery function selection and the user drain function selection is then received. Thereafter, tank level monitoring at a first rate until the at least one of the delivery or drain functions is detected is initiated. Then, tank level monitoring at a second rate until the at least one of the delivery or drain functions has ended is initiated. Next, an alarm to indicate that the at least one selected function occurred is provided.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
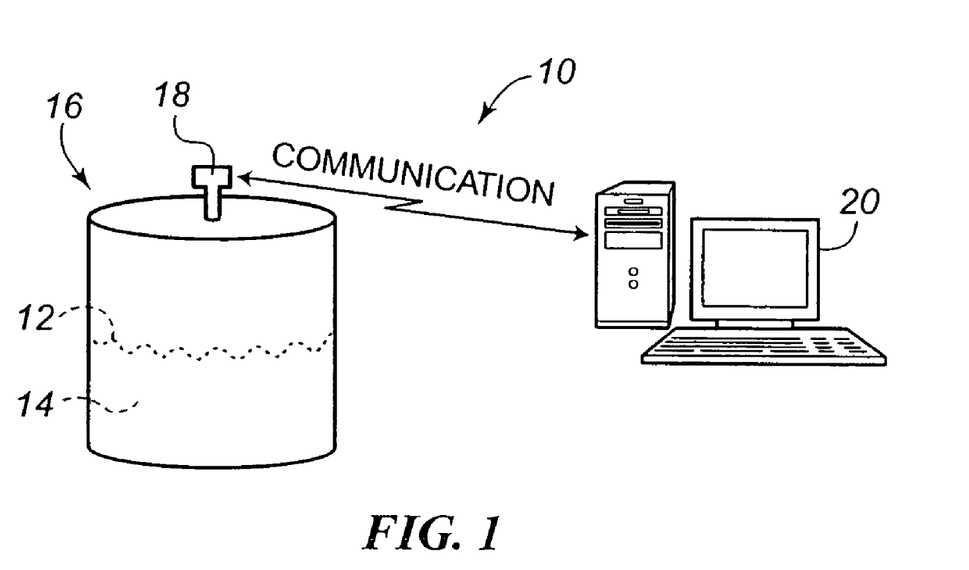
FIG. 1 is a simplified schematic view of an exemplary embodiment of a tank level monitoring system in which an embodiment of the system and method of the present invention find particular applicability.

Referring to FIG. 1, a system 10 capable of monitoring a level 12 of product 14 in a tank 16 using a monitor 18 is illustrated. As will be explained more fully below, in the system 10 of the present invention a method is provided that advantageously compares the level 12 of the product 14 in the tank 16 to one or more parameters that have been input or keyed in to a computer or data center 20 by a user or that have been predetermined. This computer or data center 20 may be a centralized facility which monitors and reports on numerous tank installations, may be a thin client that communicates with such a data center, or may be a stand alone computer at an installation or remote that receives information directly from the tank level monitor 18.

Once the particular levels at which a user desires to be notified or at which the user wants a particular function to be initiated have been input or preset, the system of the present invention monitors the tank level 12 in a normal manner. However, once these parameters have been exceeded, the system 10 initiates the special functionality provided by the method of the present invention. In a preferred embodiment of the present invention, the method also generates an alarm signal that may be communicated to the user in a number of different ways as will be discussed more fully below. Through such a system and method, the user of the system and/or the owner of the tank 16 is well informed about the status of the product, the level of product, and the like even if the user is not in the vicinity of the tank through the special functionality provided by the system and methods of the present invention.

Such special functionality includes detection and generation of an alarm signal if a delivery or drain of the product is detected as claimed herein, if a theft of the product is detected as claimed in co-pending U.S. patent application Ser. No. 11/199,758, entitled THEFT DETECTION USING A LEVEL MONITORING SYSTEM, filed on even date herewith, or if an excessive rise or fall in the level of the product is detected as claimed in co-pending U.S. patent application Ser. No. 11/199,982, entitled EXCESSIVE PRODUCT USAGE DETECTION USING A LEVEL MONITORING SYSTEM, filed on even date herewith, the teachings and disclosure of each are hereby incorporated in their entireties by reference thereto.

As in a typical tank level monitoring system, such as the Centeron® tank level monitoring system available from Robertshaw Industrial Products of Maryville, Tenn., the monitor 18 is operatively coupled to the tank 16 and designed to monitor the level 12 of the product 14 in the tank. The monitor 18 can be one of a variety of monitors such as, for example, a gauge monitor, a cellular monitor, a satellite communication monitor, a radar monitor, an ultrasonic monitor, a pressure monitor, a float monitor, a capacitance monitor, etc. Communications from and with these monitors 18 can be via wired communications, wireless radio frequency (RF) communications, cellular, satellite, etc. or a combination of these depending on the installation location, location of the computer/data center 20, the user, etc.

In addition to having the ability to observe the product 14 in the tank 16, the monitor is able to relay information regarding the product to the user, e.g. temperature of the product in the storage tank 16. Depending on the communication channel utilized by the particular monitor 18 and the cost/availability of data transfer over that channel, the monitor 18 may be required to store data and information regarding the product and perform logic operations between information transmission sessions. In such an embodiment, the monitor 18 is provided with, for example, a memory, a processing unit, and/or other components such that the monitor is considered to be a "smart" device. One such monitor is the Quicksilver™ cellular monitor, which provides only periodic cellular transmissions that may include information regarding many readings, operation of the tank, etc. based on the cost of cellular communications.

Since the product 14 in the tank 16 is typically a bulk commodity or material such as gasoline, propane, a fertilizer, a chemical, a fuel, a waste material, and the like, the monitor 18 is preferably configured to observe and/or measure such substances or a level 12 thereof. Additionally, the monitor 18 is able to measure and/or gauge the level 12 of the product 14 whether the level is constant or in flux since the tank 16 is typically called upon to store, temporarily hold, disperse, and deliver the product as needed.

The computer or data center 20 can comprise a single computer, a server, a network of computers and/or servers, and the like. In general, the data center 20 can comprise almost any device that includes a microprocessor or other computing means. The data center 20 is well suited to make comparisons, store statistics, relay data, display information and/or perform logic calculations relating to the monitoring of tank levels and relaying that information to users. This information may be made available to such users via the Internet or other means. Upon the occurrence of certain provided conditions, the data center 20 generates an alarm signal (or simply an alarm or signal) that may be displayed or announced locally at the data center 20, or may be relayed to a user. Such an alarm is preferably audible, visual, or both. The alarm can be relayed to a personal digital assistant (PDA), a pager, a handheld device, a cellular phone, a Blackberry device, and the like. Further, the alarm can be received as an electronic mail (e-mail) message sent over the Internet, as a text message sent via the short mail service (SMS), as a picture or image, as a call to a cell phone, and/or as video that is either delayed or sent in real-time.

Figure 2:
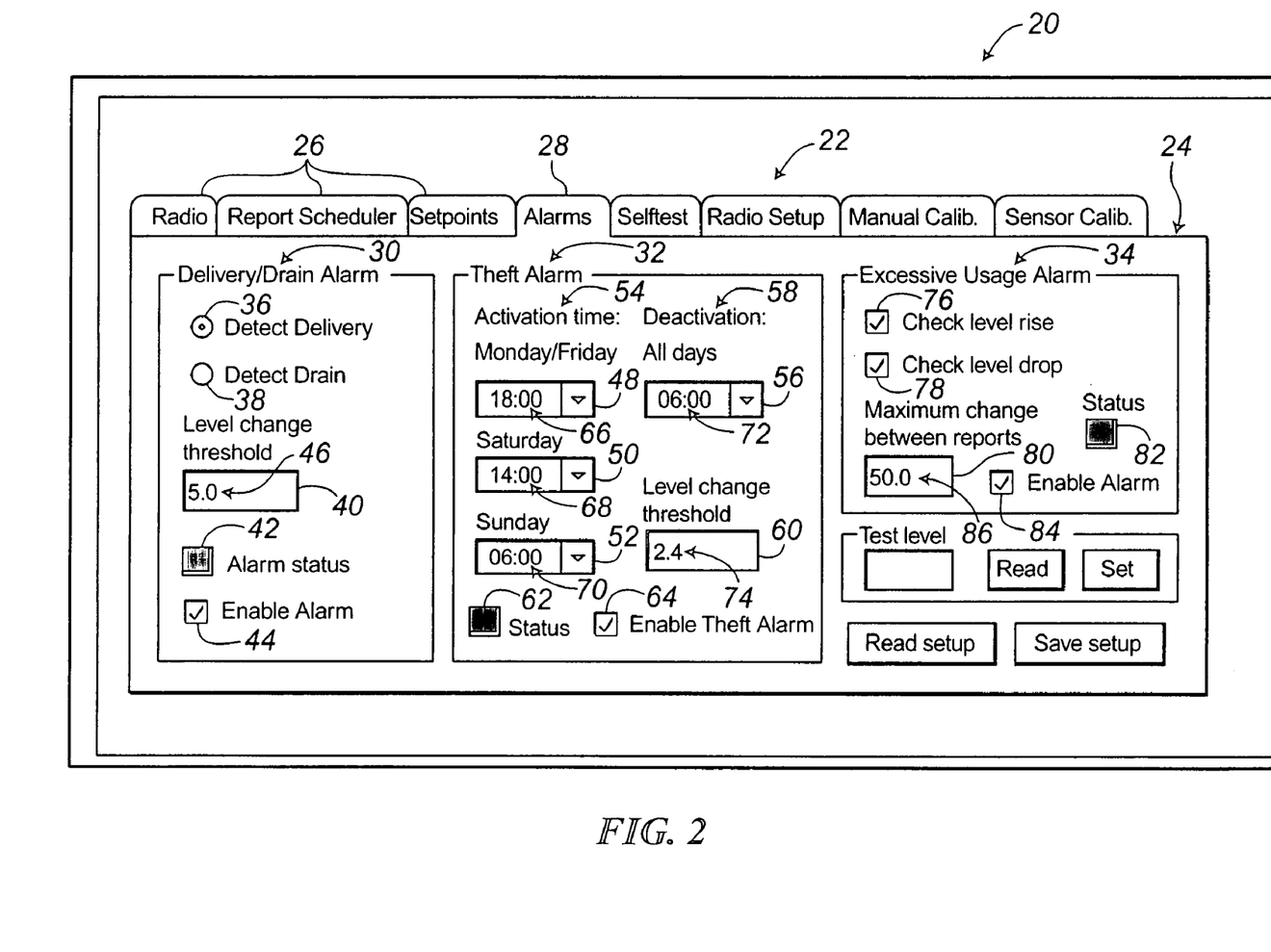
FIG. 2 is an exemplary user interface generated by an embodiment of the system of the present invention.

As depicted in FIG. 2, the data center 20 provides and/or displays a user interface 22 such as a graphical user interface (GUI). As well known by those skilled in the art, the GUI often includes such features as dropdown menus, check boxes, icons, pointing devices, and inputtable fields. The user interface 22 provides a simple, user friendly platform for entering data and information into, for example, the data center 20, and for displaying such information for a human user.

The interface 22 generated by the system of the present invention and depicted in FIG. 2 comprises a window 24 or "pop up" box under an Alarms tab 28. The complete user interface window 24 includes a plurality of tabs 26 that may be selected to bring up or display other functional windows. In the disclosed illustration, the alarm tab 28 has been selected from the plurality of tabs 26 and, therefore, information pertaining to "alarms" is displayed for viewing and/or manipulation by a user of the data center 20 or remotely via, e.g., a thin client interface to the data center 20.

The alarm tab 28 displays one or more categories of alarms. In one embodiment of the system of the present invention, the alarm tab 28 is partitioned to separately display a delivery/drain alarm functionality section 30, a theft alarm functionality section 32, and an excessive usage alarm functionality section 34. As will be explained more fully below, if the conditions of any of these alarms are met and/or violated and that particular alarm has been enabled, an alarm signal is generated.

The delivery/drain alarm section 30 comprises a detect delivery selection icon 36, a detect drain selection icon 38, a level change threshold entry window 40, an alarm status indicator 42, and an enable alarm check box 44. The detect delivery selection icon 36 and the detect drain selection icon 38 can be selected or deselected (e.g., by clicking a mouse over the icon) based on the desire of the user and/or customer. In the illustrated embodiment of FIG. 2, the detect delivery selection icon 36 shows that the detect delivery option has been selected as evidenced by the indicia (e.g., black dot) within the selection icon. Conversely, the detect drain selection icon 38 shows that the detect drain option has not been selected as evidenced by the lack of any indicia within the selection icon.

The level change threshold entry window 40 allows a user of the system 10 to enter a threshold level of change 46 at which the Delivery/Drain alarm will be generated. The threshold level of change 46 can be keyed into the threshold entry window 40, selected from a list of choices and/or recommendations in a menu, may be preset by the system and the like. In FIG. 2, the threshold level of change 46 that has been input into the user interface 22 by a user or preset is "5.0" inches, although the units can be varied depending on the preference of the user of the system.

The threshold level of change 46 is a figure that represents an amount of change that is tolerable for a given property of the product 14 in the tank 16 (FIG. 1). The threshold level of change 46 displayed in the box 40 can have a variety of different units depending on the particular monitor 18 used by the system 10. For example, the threshold level of change 46 might represent inches when a gauge monitor is used, a pressure when a pressure monitor is used, and the like. Also, the threshold level of change 46 can be represented in English and/or metric units.

The alarm status indicator 42 provides a visual representation regarding the condition of the alarm signal. For example, if the alarm signal has been triggered, the status indicator 42 may illuminate and provide other visual indications of an alarm, e.g. it may illuminate red and flash. In contrast, if the alarm signal has not been generated, the status indicator 42 may provide such a visual indication, e.g. be green and steady.

The enable alarm check box 44 generally provides a user with an "on/off" switch for the delivery/drain alarm 30. As shown in FIG. 2, when the indicia (e.g., check mark) is displayed in the alarm check box 44, the alarm is active. However, if the enable alarm check box 44 does not contain the indicia, the alarm 30 has been deactivated. As with the other check boxes in general, the enable alarm check box 30 can be toggled between "on" and "off" with a click of a mouse or a simple keyboard command.

The theft alarm section 32 comprises a temporal selection factors that allow a user to select different parameters for different days of the week. In the displayed embodiment, the theft alarm section 32 provides a Monday/Friday (normal work week) menu 48, a Saturday menu 50, and a Sunday menu 52 under an activation time category 54, an all days menu 56 under a deactivation time category 58, a level change threshold entry window 60, an alarm status indicator 62, and an enable alarm check box. 64.

The Monday/Friday menu 48, the Saturday menu 50, and the Sunday menu 52 each provide a list of user selectable activation times 66, 68, 70 that dictate a schedule of activation for the theft alarm 32. This activation time would generally correspond to the close of business for that day after which product usage from the tank could be considered to be a result of theft. Similarly, the all days menu 56 provides a list of user selectable deactivation times 72 that dictate a schedule of deactivation for the theft alarm 30, typically corresponding to the start of business. The times 66, 68, 70, 72 in the menus 48, 50, 52, 56 are formatted in either standard time (12 hour) and/or military time (24 hour) and are preferably incremented to include hours and minutes.

The activation and deactivation times 66, 68, 70, 72 in the activation and deactivation time categories 54, 58 can be configured and/or selected such that the product 14 and product level 12 in the tank 16 (FIG. 1) is observed or under surveillance at various times during a twenty-four hour period and during the week. As such, the theft alarm 32 is, for example, activated after normal business hours, deactivated during normal business hours, and then activated again after the business day is done. In other embodiments, the theft alarm 32 can be activated and deactivated at different times for each day of the week and/or weekend.

Although the activation time category 54 is illustrated to include three menus 48, 50, 52, and the deactivation time category 58 is illustrated to include one menu 56 in FIG. 2, other arrangements can be used. For instance, the activation time category 54 can include menus for each day of the week, the deactivation time category 58 could be partitioned into two menus representing weekdays and weekends, or partitioned to include menus for each day of the week, and the like.

Similar to above, the level change threshold entry window 60 allows a user of the system 10 to enter a threshold level of change 74 at which the theft alarm functionality may be triggered. The threshold level of change 74 can be keyed into the threshold box 60, selected from a list of choices and/or recommendations in a menu, preprogrammed into the system and the like. In FIG. 2, the threshold level of change 74 that has been input into the user interface 22 by a user is "2.4" inches.

Again, the threshold level of change 74 is a figure that represents an amount of change that is tolerable for a given property of the product 14 in the tank 16 (FIG. 1). The threshold level of change 74 displayed in the box 60 can have a variety of different units depending on the particular monitor 18 used by the system 10. For example, the threshold level of change 74 might represent inches when a gauge monitor is used, a pressure when a pressure monitor is used, and the like. Also, the threshold level of change 74 can be represented in English and/or metric units.

The alarm status indicator 62 provides a visual representation regarding the condition of the alarm signal. As discussed above, in one embodiment if the alarm signal has been triggered, the status indicator 62 may be red and flashing. In contrast, if the alarm signal has not been generated, the status indicator 62 may be green and steady. Other visual indications may be provided as desired.

The enable alarm check box 64 generally provides a user with an "on/off" switch for the theft alarm 32. As shown in FIG. 2, when the indicia (e.g., check mark) is displayed in the alarm check box 64, the alarm is active. However, if the enable alarm check box 64 does not contain the indicia, the alarm 32 has been deactivated. As with the other check boxes in general, the enable alarm check box 64 can be toggled between "on" and "off" with a click of a mouse or a simple keyboard command.

The excessive usage alarm section 34 comprises a check level rise check box 76, a check level drop check box 78, a level change threshold entry window 80, an alarm status indicator 82, and an alarm enable check box 84. The check level rise check box 76 and the check level drop check box 78 can be selected or deselected based on the desire of the user. As shown in FIG. 2, each of the boxes 76, 78 indicates that the check level rise and check level drop options have been selected as evidenced by the indicia (e.g., check mark) within the check box. By selectively choosing one or both of the check boxes 76, 78, (e.g., by clicking with a mouse), the check level rise and check level drop options can be selected or deselected.

Similar to above, the level change threshold entry window 80 allows a user of the system 10 to enter a threshold level of change 86 (i.e., maximum change between reports) at which the excessive usage alarm functionality is triggered. The threshold level of change 86 can be keyed into the threshold entry window 86, selected from a list of choices and/or recommendations in a menu, preset by the system and the like. In FIG. 2, the threshold level of change 86 that has been input into the user interface 22 by a user is "50.0" inches.

Again, the threshold level of change 86 is a figure that represents an amount of change that is tolerable for a given property of the product 14 in the tank 16 (FIG. 1). The threshold level of change 86 displayed in the box 80 can have a variety of different units depending on the particular monitor 18 used by the system 10. For example, the threshold level of change 86 might represent inches when a gauge monitor is used, a pressure when a pressure monitor is used, and the like. Also, the threshold level of change 86 can be represented in English and/or metric units.

The alarm status indicator 82 provides a visual representation regarding the condition of the alarm signal. For example, if the alarm signal has been triggered, the status indicator 82 may illuminate and provide other visual indications of an alarm, e.g. it may illuminate red and flash. In contrast, if the alarm signal has not been generated, the status indicator 82 may provide such a visual indication, e.g. be green and steady.

The enable alarm check box 84 generally provides a user with an "on/off" switch for the excessive usage alarm 34. As shown in FIG. 2, when the indicia (e.g., check mark) is displayed in the alarm check box 84, the alarm is active. However, if the enable alarm check box 84 does not contain the indicia, the alarm 34 has been deactivated. As with the other check boxes in general, the enable alarm check box 84 can be toggled between "on" and "off" with a click of a mouse or a simple keyboard command.

In one embodiment of the present invention, each of the level change threshold entry windows 40, 60, 80 can independently and separately receive a threshold level of change 46, 74, 86 input by a user. Therefore, any change to one of the threshold levels of change 46, 74, 86 affecting one of the alarms 30, 32, 34 will not influence the other threshold levels of change and other alarms.

If desired, each of the check boxes, indicators, menus, buttons, and the like displayed within the user interface 22 of FIG. 2 can be modified and repositioned without detracting from the invention. Moreover, boxes, check boxes, and menus can all be interchanged.

Figure 3:
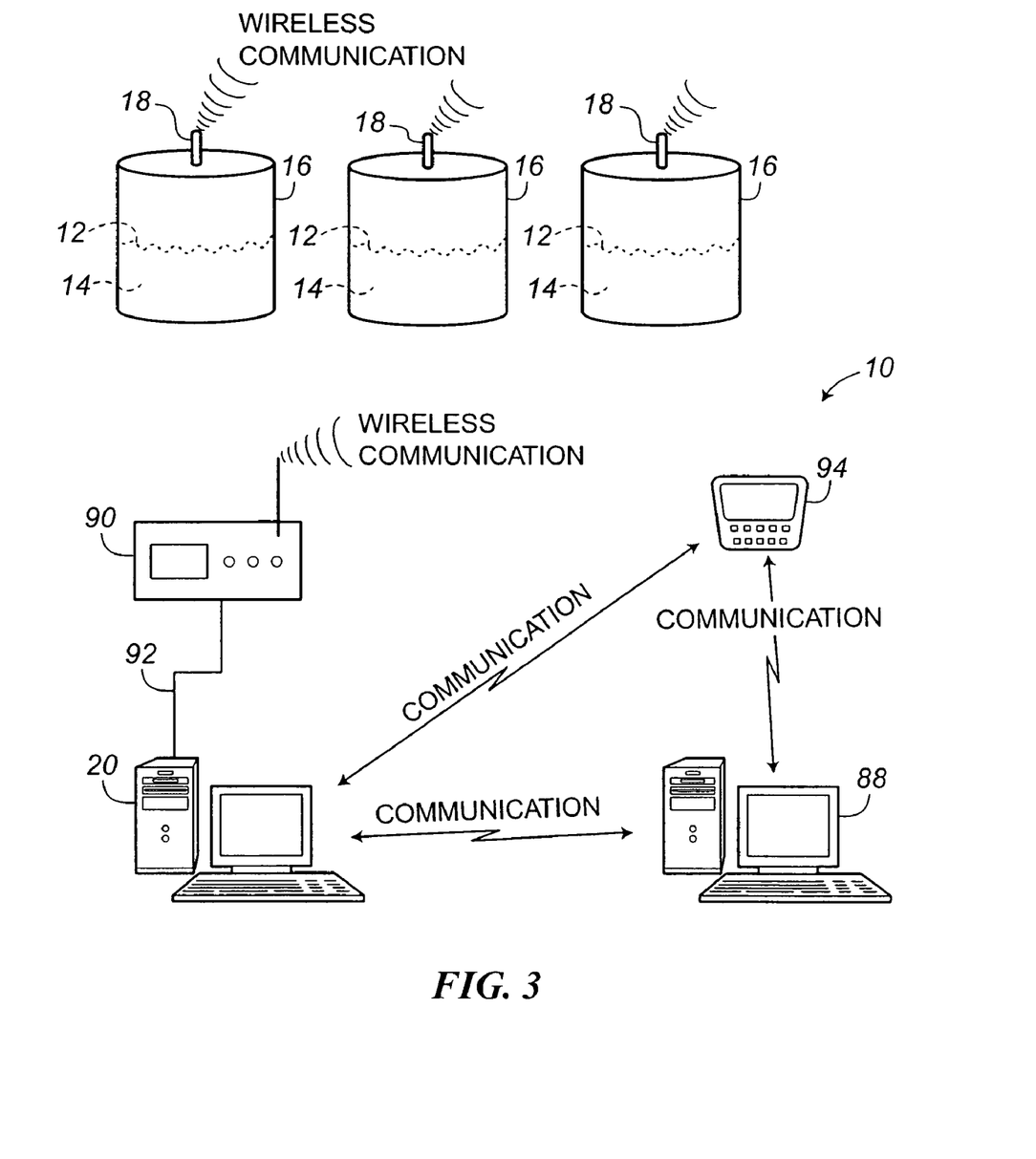
FIG. 3 is a simplified schematic view of an alternate embodiment of a tank level monitoring system in which an embodiment of the system and method of the present invention find particular applicability.

In one embodiment of the system of the present invention, as illustrated in FIG. 3, the system 10 further comprises a device 88 (e.g., a computer, a monitor and a keyboard) that may interface with the data center 20 as a "thin client". The thin client 88 communicates with the data center 20 via, e.g., the Internet to set and/or monitor the information provided thereby. As such, the thin client 88 displays, via the user interface 22 of FIG. 2, the data stored in the data center 20 and permits the user to manipulate and/or view that data. The thin client 88 is typically remotely located with respect to the data center 20.

As illustrated in this FIG. 3, the system 10 may include a controller 90 depending on the type of tank level monitoring system is used. The controller 90 can be any one of the controllers commercially available from Robertshaw Industrial Products of Maryville, Tenn. In general, the controller 90 manages the flow of information from the monitor 18 to the data center 20. In other words, the controller 90 acts an intermediary device capable of receiving information from the monitor 18, wirelessly or via wired communication, and then relaying that signal to the data center 20 over a communications link 92. This communications link 92 may be wired or wireless, and may include combinations of each, e.g. satellite link to a communications center that relays the information to the data center 20 via a telephone or other land line, etc. As illustrated, the controller 90 is capable of communicating with a plurality of monitors 18, preferably accommodating each of the monitors simultaneously.

As illustrated in this exemplary embodiment of the system of the present invention, the system 10 also includes a remote notification device 94. The remote notification device 94 is, for example, a personal digital assistant (PDA), a pager, a handheld device, a cellular phone, a Blackberry device, and the like. The device 94 is adapted to communicate (e.g., receive and send information, synchronize with) with the data center 20 and/or with the computer 88. Since the device 94 is not tethered to any other piece of equipment and communicates wirelessly, the device is often remotely located relative to one or more of the data center 20, the controller 90, the monitor 18, and the tank 16.

In those embodiments employing the remote notification device 94 and the thin client 88, information pertaining to the monitor 18, the tank 16, the product 14, the level of product 12, as well as the alarm signals, can be transmitted to the device. The information can arrive and be received by the device 94 and the thin client 88 as an electronic mail (e-mail) message sent over the Internet, as a text message sent via the short mail service (SMS), as a picture or image, an audible alarm or message sent to the cell phone and/or as video that is either delayed or sent in real-time. As such, the user of the device 94 and/or the thin client 88 is able to be constantly appraised of events related to the tank 16, product level 14 and/or product 12.

Figure 4:
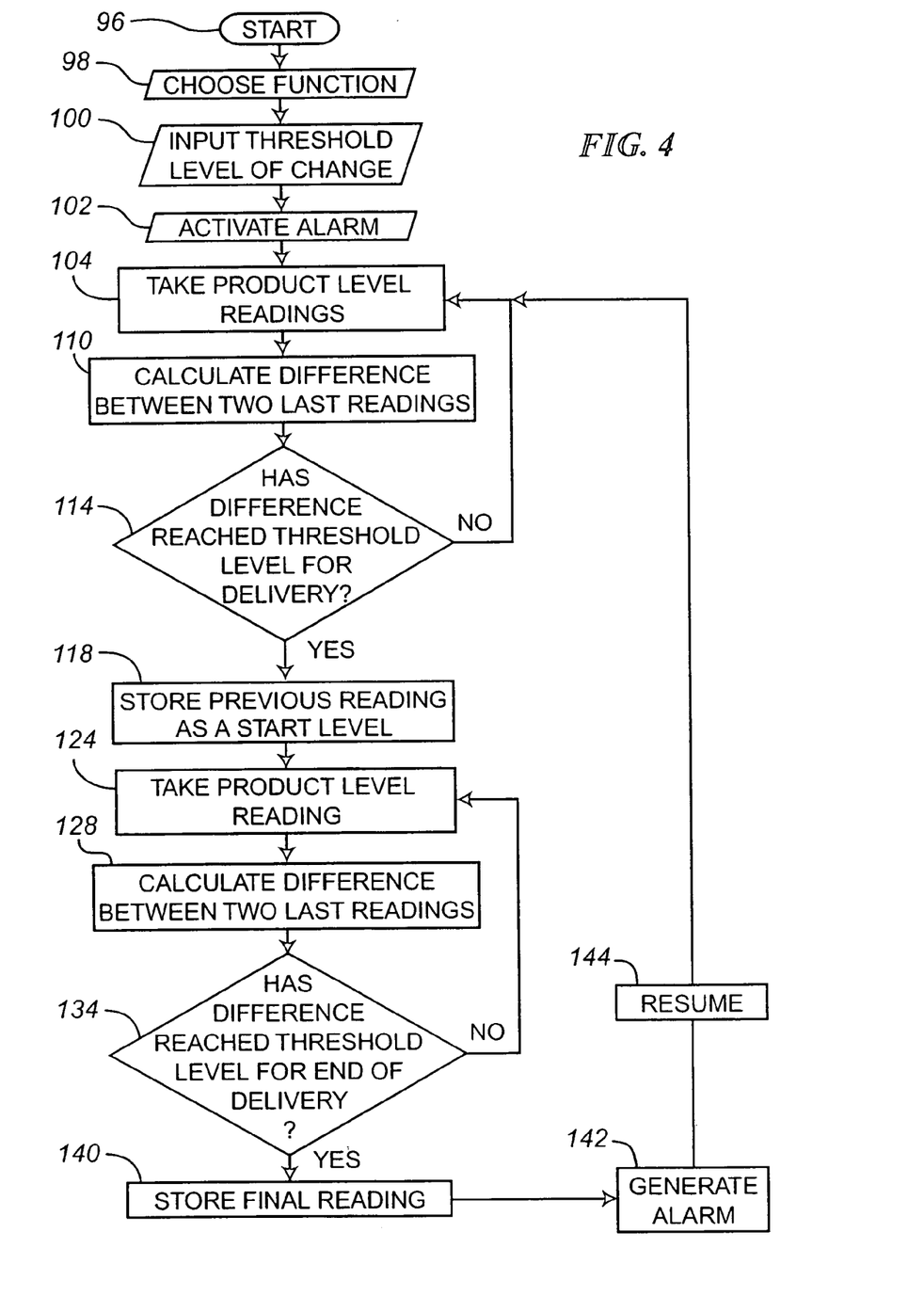
FIG. 4 is a simplified flow diagram illustrating an aspect of an embodiment of the present invention whereby delivery and drain information may be determined and displayed on the user interface of FIG. 2.
Figure 5:
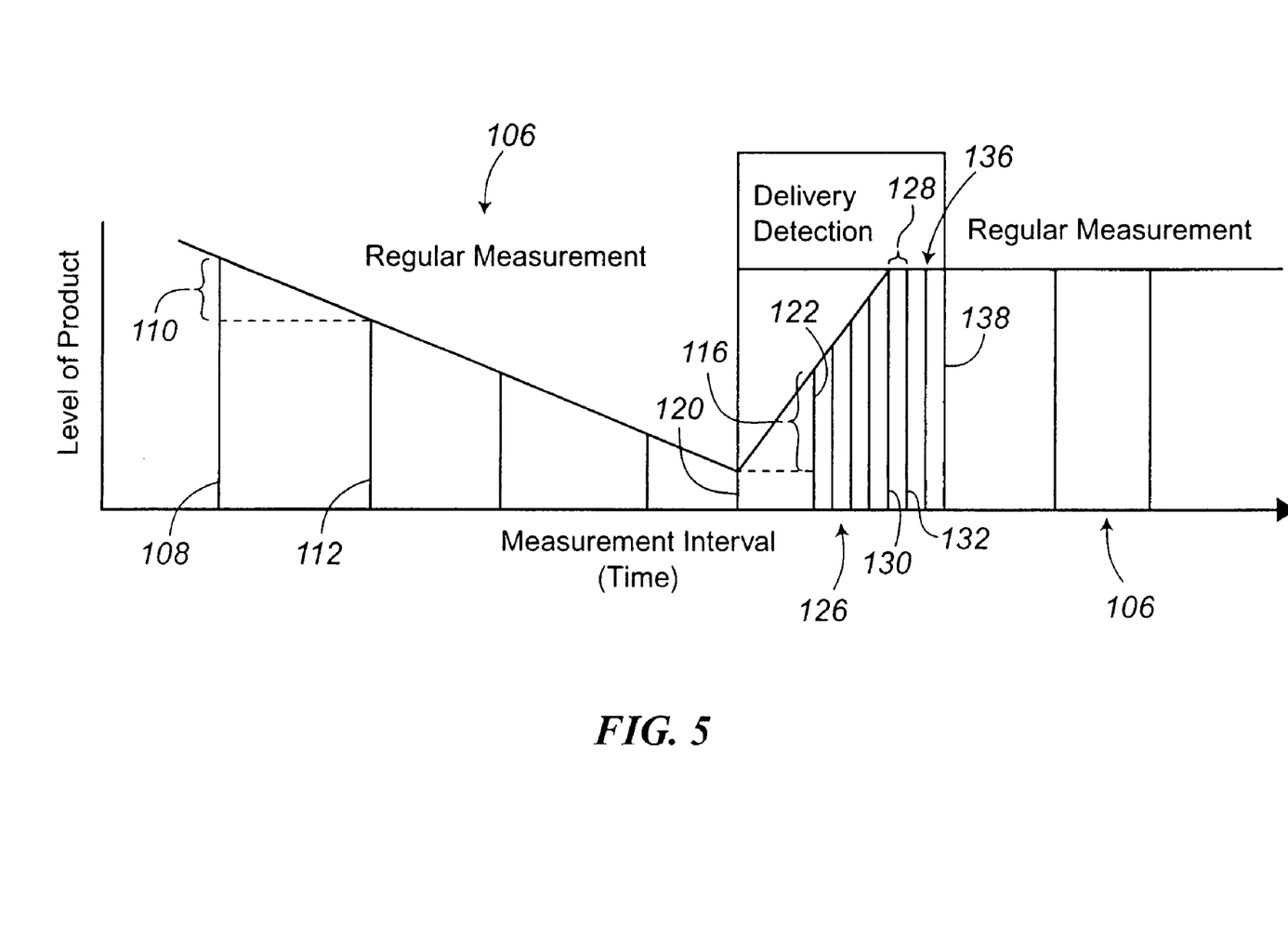
FIG. 5 is a graphical illustration of the operation of the delivery and drain detection method of one embodiment of the present invention.

Referring to FIGS. 2, 4 and 5, the delivery drain alarm functionality and method of the present invention will be described. As indicated in the flow diagram of FIG. 4, once the user starts 96 the process, the user chooses 98 either or both of the delivery detection and drain detection functions by selecting the appropriate detect delivery check box 36 and detect drain check box 38 on the user interface 22 illustrated in FIG. 2. Thereafter, the user inputs 100 a threshold level of change 46 (FIG. 2), either at the data center 20 and/or by using the controller 90, the thin client 88, and/or the remote notification device 94. The threshold level of change 46 can be input by keying in the data, selecting the level from a drop down menu including a list of choices, and the like. If not already done, the user next activates the delivery/drain alarm 102 using the enable check box 44 illustrated in FIG. 2.

With the deliver/drain alarm 30 enabled, the monitor 18 begins to take product level readings 104 at a first rate illustrated in FIG. 5 as a regular measurement rate 106. The first rate 106 of FIG. 5 is determined by the user and/or determined by the data center 20. After a reading 108 is taken, the method of FIG. 4 calculates a difference between a new reading 112 in FIG. 5 and the previous reading 108 as illustrated by block 110 of FIG. 4. That difference 110 is then compared at step 114 to the threshold level of change set in window 46 of FIG. 2. If the difference 110 has not reached and/or exceeded the threshold level of change, the monitor continues to take readings 104 as normal at the first rate. However, if the difference has reached and/or exceeded the threshold level of change, the previous reading is stored at step 118. The previous reading stored by step 118 is preferably the reading 120 (see FIG. 5) that immediately precedes the last reading 122 taken by the monitor when the difference first reached and/or exceeded the threshold level of change.

In one embodiment, when the difference 116 in the readings has first reached and/or exceeded the threshold level of change, the monitor stores and/or records the reading 120 of the level of the product in the tank. In another embodiment, the monitor relays the reading 120 to the data center and, thereafter, the data center stores the reading.

After the reading 120 has been stored at step 118, the monitor begins to taking readings at step 124 at a second rate illustrated in FIG. 5 as rate 126. Preferably, the second rate 126 provides readings more frequently than the first rate 106. After the monitor has begun taking readings at the second rate 126, a difference between individual readings (e.g., 130, 132) is calculated at step 128 (FIG. 4). When the difference of step 128 is no longer more than the threshold level of change or is no longer changing in the same direction (e.g. no longer increasing in a fuel storage tank or no longer decreasing in a waste storage tank) for a predetermined number of readings 136 (FIG. 5), this indicates that the fill or drain operation has been completed. That is, in the system illustrated by FIG. 5, once the level stops increasing, it is determined that the fill operation has been completed. A final reading 138 of the level is then taken and recorded. In one embodiment, the monitor stores the final reading 138. In another embodiment, the monitor relays the final reading 138 to the data center and, thereafter, the data center stores 140 the final reading. In the embodiment where the monitor has stored the start and final readings 120, 138, the monitor relays the start and final readings to the data center.

After the data center 20 has received the relayed readings 120, 138, the data center automatically generates an alarm signal at step 142 that is audible, visual, or both to indicate to the user that a delivery or a drain operation has been accomplished. Alternatively, the alarm signal generated by step 142 may occur after step 114 has determined that a drain or fill operation has begun. In one embodiment, the alarm signal 142 includes the initial and final readings 120, 138 taken by the monitor 18. By generating the alarm signal 142, the data center 20 has indicated to the user that the monitor 18 has detected either a drain or a delivery of the product 14. The alarm function then resumes 144 by once again taking readings 104 at the first rate 106.

Several drain and delivery events can be detected during continued operation of the system 10. In other words, the monitor 18, data center 20, and user can work together to continuously and/or continually monitor the level 12 of product 14 in the tank 16. Thus, no matter what time of the day it is and what day of the week it is, the system 10 permits the tank 16 to be adequately monitored to detect and record drain and delivery events to prevent fraudulent invoicing for such operations.

Figure 6:
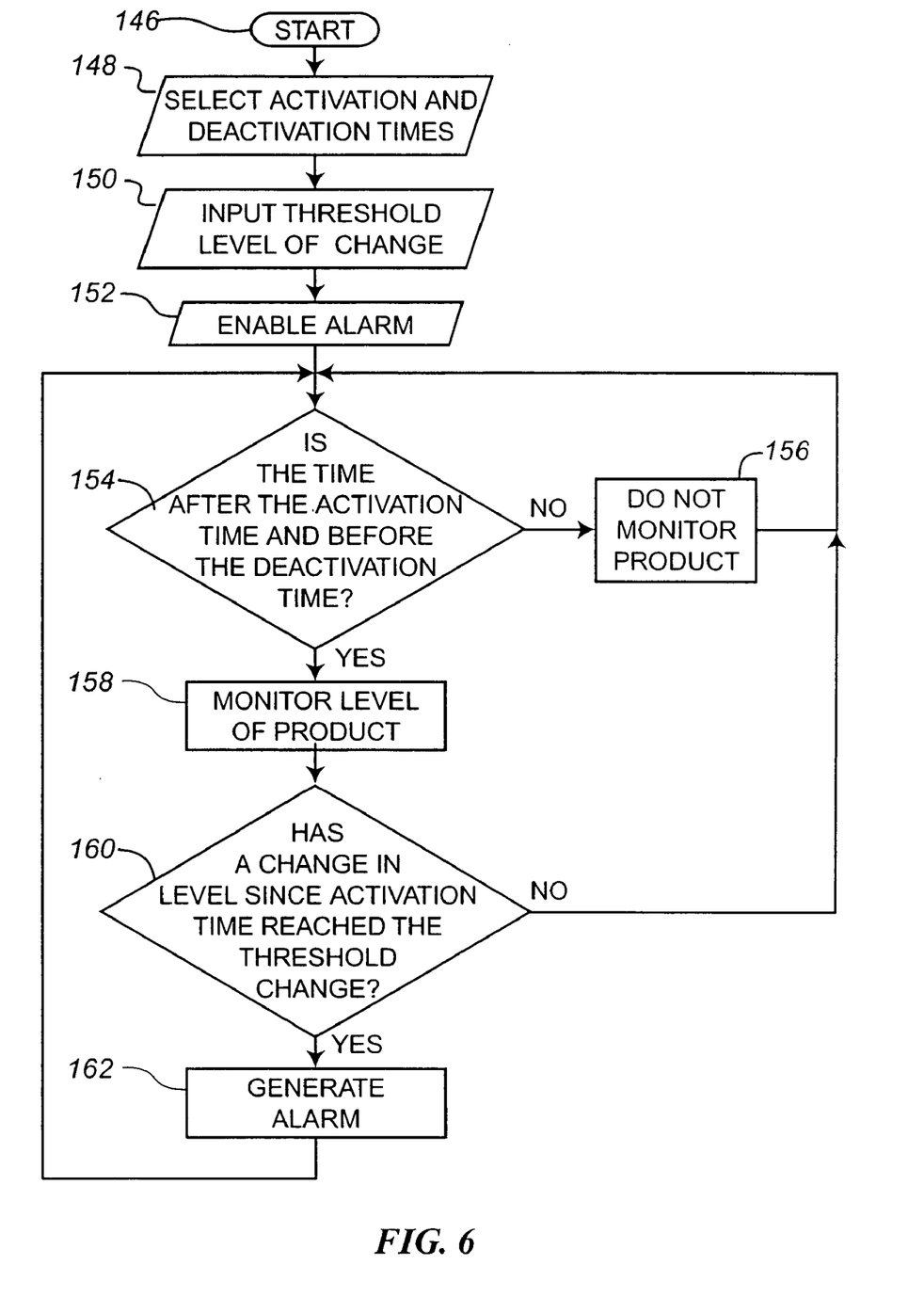
FIG. 6 is a simplified flow diagram illustrating a further aspect of an embodiment of the present invention whereby product theft may be determined and an alarm may be provided.

Referring to FIGS. 2 and 6, the theft alarm function 32 method starts 146 and performs as follows. First, the desired activation times 54 are selected at step 148 by a user from one or more of the Monday/Friday menu 48, the Saturday menu 50, and the Sunday menu 52 on the user interface 22. Similarly, the desired deactivation time 58 is selected from the all days menu 56. The threshold level of change 74 is then input at step 150 by the user into the threshold level change box 60 via the user interface 22. If not already done, the user next activates 152 the theft alarm 32 using the enable check box 64.

With the theft alarm enabled, it is determined 154 if the current time (i.e., present time) is between one of the activation times 66, 68, 70 and the deactivation time 72. If the current time is not after one of the activation times 66, 68, 70 and before the deactivation time 72, the level 12 of the product 14 in the tank 16 is not monitored 156 by the monitor 18 for purposes of the theft alarm function. In other words, the current time relates to a normal working period when the tank level is expected to be reduced as product is used during the working day.

If the current time is after one of the activation times 66, 68, 70 and before the deactivation time 72, the level 12 of the product 14 in the tank 16 is monitored 158 by the monitor 18 for theft detection. While the level 12 of the product 14 is being monitored 158, it is determined at step 160 if a change in the level 12 of product 14 in the tank 16 has reached and/or exceeded the threshold level of change 74 set by the user. If the change in the level has not reached and/or exceeded the threshold level of change 74, and if the current time 154 is still between one of the activation times 66, 68, 70 and the deactivation time 72, the monitor 18 simply continues to monitor 158 the level 14 of product 16.

If, however, the change in the level 14 has reached and/or exceeded the threshold level of change 74, an alarm signal is generated at step 162 to notify the user that a theft of the product 14 has occurred or is occurring. This is particularly beneficial since activation of the alarm 32 permits the product 14 in the tank 16 to be monitored and/or under surveillance outside of normal business hours. The monitor 18 keeps watch of the product 14 when that product does not normally get used.

Typically, the data center 20 is the component within the system 10 that generates the alarm signal 162. In such an embodiment, prior to the alarm being generated 162, the monitor 18 relays the fact that the change in the level 14 has reached and/or exceeded the threshold level of change 74 to the data center 20. Thereafter, the data center 20 generates the alarm signal 162 and, in some cases, relays the change information and/or the alarm signal to the thin client 88 and the remote notification device 94.

In another embodiment, the monitor 18 relays the reached and/or exceeded threshold information to the controller 90. In such an embodiment, the controller 90 can generate the alarm signal 162 and then relay the information to the data center 20. In other embodiments, the controller 90 relays the information to the data center 20 and/or the thin client 88 and the remote notification device 94 without having generated the alarm. In those instances, the data center 20 generates the alarm and relays the alarm signal, with or without the information, to one or more of the thin client 88 and the remote notification device 94.

Since several of the devices in the system 10 are able to generate the alarm signal, and the other devices are able to relay that signal, a user of the theft alarm 32 is quickly and conveniently notified if a theft of the product occurs or is occurring. This is true even if the user of the system 10 is remotely located with respect to the tank 16.

Figure 7:
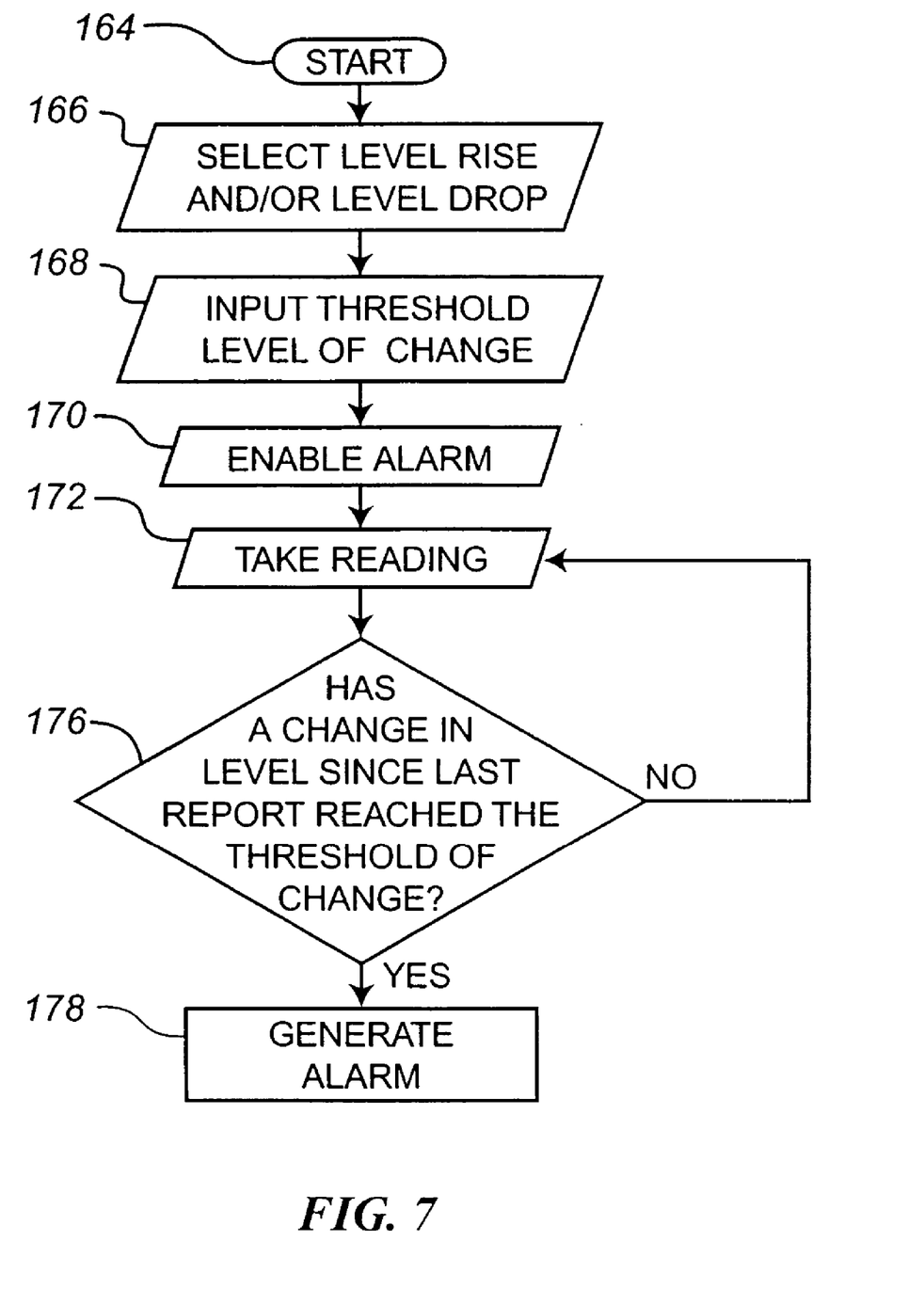
FIG. 7 is a simplified flow diagram illustrating yet a further aspect of an embodiment of the present invention whereby excessive product usage may be determined and an alarm may be provided.

Referring to FIGS. 2 and 7, the excessive usage alarm function 34 method starts 164 and performs as follows. First, the user selects at step 166 either or both of the check level rise check box 76 and the check level drop check box 78 on the user interface 22. Thereafter, the user inputs 168 and/or keys in the level change threshold 86 desired. If not already done, the user next activates 170 the excessive usage alarm 34 using the enable check box 84.

With the excessive usage alarm enabled, the monitor 18 takes an initial reading 172 of the level 12 of the product 14 in the tank 16. In-one embodiment, the initial reading is stored by the monitor 18. A predetermined amount of time after the initial reading has been taken, as determined by the normal scheduling of the monitor, the monitor 18 takes a later reading 174 of the level 12 of product 14 in the tank 16. Again, in one embodiment, the monitor stores that reading. With the two readings recorded and/or stored, the monitor 18 then compares 176 the initial reading to the later reading. If the initial reading and the later reading differ by at least the threshold level of change 86 input by the user, an alarm signal is generated 178. This alarm signal can be produced by the monitor 18 itself or, more preferably, created by the data center 20. In the embodiment where the data center 20 generates the alarm signal, the monitor 18 relays the initial reading, the current reading, and/or the comparison information to the data center as soon as it is determined that the excessive usage has occurred. In embodiments that report level information only periodically, e.g. in embodiments using a cellular modem, this will only result in one additional report outside of the scheduled reports, yet provide immediate indication of the excessive usage. This allows the device to report less frequently (saving cost), yet still capture excessive level changes quickly and automatically.

If the initial reading and the later reading do not differ by more than the threshold level of change, the initial reading is replaced 180 by the most recently taken later reading and the monitor 18 takes a "new" later reading after another period of time has elapsed. Thereafter, the initial reading (which is the "old" later reading) and the "new" later reading are compared 176 to each other and, if the difference between the readings has reached or has exceeded the threshold level of change, the alarm signal is generated 178.

In one embodiment, the monitor 18 takes an initial reading of the level 12 of the product 14 in the tank 16 and immediately relays the initial reading information to the data center 20. The data center 20 then stores that initial reading. After a predetermined amount of time has elapsed (e.g., per a predetermined schedule), the monitor 18 takes a later reading of the level 12 of the product 14 in the tank 16 and immediately relays the later level reading to the data center 20. With the two readings recorded and/or stored, the data center 20 compares the initial reading to the later reading. If the initial reading and the further reading differ by more than the threshold level of change input by the user, an alarm signal is generated by the data center 20.

Using the excessive usage alarm 34, should a leak in the tank 16 and/or an unexpectedly high demand for product occur, a user is promptly notified by an alarm signal. Advantageously, the alarm signal can be relayed and/or transmitted to locations remote from the tank 16. Therefore, even though a user of the system 10 is remotely located relative to the tank 16, the user is advised if too much product 14 is being or has been used.

All references, including publications, patent applications, and patents cited herein are hereby incorporated by reference to the same extent as if each reference were individually and specifically indicated to be incorporated by reference and were set forth in its entirely herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context

What is claimed is:

1. A method of detecting at least one of a delivery and a drain of product in a storage tank, the method comprising the steps of:

monitoring at a first rate a product level in the tank;

determining that at least one of the delivery or drain of product has begun;

monitoring at a second rate the product level in the tank;

determining that the at least one of the delivery or drain of product has ended; and transmitting information related to an amount of product delivered or drained during the at least one of the delivery or drain of the product; and wherein the step of determining that at least one of a delivery or drain of product has begun comprises the steps of:

reading a first product level at the first rate before the at least one of the delivery or drain of product has begun;

reading a second product level at the first rate;

determining a difference between the first product level and the second product level; and indicating at least one of a delivery or drain of product has begun when the difference exceeds a threshold level of change.

2. The method of claim 1, further comprising the step of receiving a user-selected threshold level of change.

3. A method of detecting at least one of a delivery and a drain of product in a storage tank, the method comprising the steps of:

monitoring at a first rate a product level in the tank;

determining that at lease one of the delivery or drain of product has begun;

monitoring at a second rate the product level in the tank;

determining that the at least one of the delivery or drain of product has ended; and transmitting information related to an amount of product delivered or drained during the at least one of the delivery or drain of the product; and wherein the step of determining that at least one of a delivery or drain of product has ended comprises the steps of:

reading a first product level at the second rate after the at least one of the delivery or drain of product has begun;

reading at least a second product level at the second rate;

determining at least a difference between the first product level and the at least second product level; and indicating at least one of a delivery or drain of product has ended when the difference between the first product level and the at least second product level no longer exceeds a threshold level of change.

4. A method of detecting at least one of a delivery and a drain of product in a storage tank, the method comprising the steps of:

monitoring at a first rate a product level in the tank;

determining that at least one of the delivery or drain of product has begun;

monitoring at a second rate the product in the tank;

determining that the at least one of the delivery or drain of product has ended; and transmitting information related to an amount of product delivered or drained during the at least one of the delivery or drain of the product; and wherein the step of transmitting information related to an amount of product delivered or drained during the at least one of the delivery or drain of the product comprises the steps of:

storing a first product level reading monitored immediately before the step of determining that at least one of the delivery or drain of product has begun;

storing a second product level reading monitored immediately before the step of determining that at least one of the delivery or drain of product has ended; and transmitting the first product level reading and the second product level reading.

5. A method of detecting at least one of a delivery and a drain of product to and from a storage tank, the method comprising the steps of:

displaying a user interface having user selectable options presented thereon;

receiving at least one of a delivery function selection and a user drain function selection;

receiving a user input threshold level of change for the at least one of the delivery function selection and the user drain function selection;

initiating tank level monitoring at a first rate until the at least one of the delivery or drain functions is detected;

initiating tank level monitoring at a second rate until the at least one of the delivery or drain functions has ended; and providing an alarm to indicate that the at least one selected function occurred.

6. The method of claim 5, further comprising the step of reporting an initial tank level corresponding to the tank level at the start of the at least one selected function and a final tank level corresponding to the tank level at the end of the at least one selected function.

7. The method of claim 5, wherein the step of receiving at least one of the delivery function selection and the user drain function selection comprises the step of receiving the delivery function selection, and wherein the step of initiating tank level monitoring at the first rate until the at least one of the delivery or drain functions is detected comprises the step of detecting an increase in the product level in the tank greater than the user input threshold level of change.

8. The method of claim 5, wherein the step of receiving at least one of the delivery function selection and the user drain function selection comprises the step of receiving the drain function selection, and wherein the step of initiating tank level monitoring at the first rate until the at least one of the delivery or drain functions is detected comprises the step of detecting a decrease in the product level in the tank greater than the user input threshold level of change.

* * * * *